United States Patent
Ameisen et al.

(10) Patent No.: US 11,321,818 B2
(45) Date of Patent: May 3, 2022

(54) METHOD OF DETECTING AND QUANTIFYING BLUR IN A DIGITAL IMAGE

(71) Applicant: IMGINIT, Paris (FR)

(72) Inventors: David Ameisen, Paris (FR); Emmanuel Ameisen, San Francisco, CA (US)

(73) Assignee: IMGINIT, Paris (FR)

( * ) Notice: Subject to any disclaimer, the term of this patent is extended or adjusted under 35 U.S.C. 154(b) by 0 days.

(21) Appl. No.: 17/052,107

(22) PCT Filed: Apr. 16, 2019

(86) PCT No.: PCT/EP2019/059834
§ 371 (c)(1),
(2) Date: Oct. 30, 2020

(87) PCT Pub. No.: WO2019/211094
PCT Pub. Date: Nov. 7, 2019

(65) Prior Publication Data
US 2021/0166356 A1 Jun. 3, 2021

(30) Foreign Application Priority Data

May 4, 2018 (FR) ........................................ 1853848

(51) Int. Cl.
*G06T 5/00* (2006.01)
*G06T 7/00* (2017.01)

(52) U.S. Cl.
CPC ............ *G06T 5/003* (2013.01); *G06T 7/0002* (2013.01); *G06T 2207/10024* (2013.01); *G06T 2207/30168* (2013.01)

(58) Field of Classification Search
CPC .................. G06T 5/003; G06T 7/0002; G06T 2207/10024; G06T 2207/30168
(Continued)

(56) References Cited

U.S. PATENT DOCUMENTS

2003/0151674 A1* 8/2003 Lin .................... H04N 5/23222
348/222.1
2014/0253738 A1* 9/2014 Mullis .................. H04N 13/282
348/187
(Continued)

FOREIGN PATENT DOCUMENTS

WO WO 2012/080643 A1 6/2012

OTHER PUBLICATIONS

Search Report from French Intellectual Property Office on corresponding FR application (FR1853848) dated Nov. 8, 2018.
(Continued)

*Primary Examiner* — Ali Bayat
(74) *Attorney, Agent, or Firm* — Klein, O'Neill & Singh, LLP

(57) ABSTRACT

A method of detecting and quantifying blur in a digital image, making use of a computer and comprising:
  a step a) of obtaining a digital image comprising pixels;
  a step b) of obtaining a brightness parameter for each pixel, said step b) comprising a convolution operation with an edge detection matrix;
  a step c) of calculating a score S1 comprising the maximum, calculated over all the pixels, of the brightness parameter obtained in step b) and a second score S2 comprising a logistic function, and
  a step d) of evaluating the digital image, said digital image being considered to be blurry if the score S1 obtained in step c) is strictly less than a first predetermined threshold $S1_0$, the score S1 providing a first quantity of blur present in the digital image.

12 Claims, 2 Drawing Sheets

(58) Field of Classification Search
USPC .......................................................... 382/254
See application file for complete search history.

(56) References Cited

U.S. PATENT DOCUMENTS

| | | | |
|---|---|---|---|
| 2015/0207978 A1* | 7/2015 | Tay ........................ | G03B 13/36 348/252 |
| 2016/0307602 A1* | 10/2016 | Mertens ................ | G11B 27/031 |
| 2017/0083762 A1* | 3/2017 | Segalovitz ......... | G06K 9/00463 |
| 2021/0150707 A1* | 5/2021 | Weisenfeld ............ | G06T 7/0012 |

OTHER PUBLICATIONS

International Search Report and Written Opinion on corresponding PCT application (PCT/EP2019/059834) from International Searching Authority (EPO) dated Jul. 2, 2019.

Ciancio A. et al.: "No-Reference Blur Assessment of Digital Pictures Based on Multifeature Classifiers", IEEE Transactions on Image Processing, IEEE Service Center, Piscataway, NJ, US, vol. 20, No. 1, Jan. 1, 2011, pp. 64-75.

Vipin Kamble et al.: "No-Reference Image Quality Assessment Algorithms: A Survey", OPTIK., DE, vol. 126, No. 11-12, Jun. 1, 2015, pp. 1090-1097.

Anish Mittal et al.: "Blind/Referenceless Image Spatial Quality Evaluator", Signals, Systems and Computers (Asilomar), 2011 Conference Record of the Forty Fifth Asilomar Conference ON, IEEE, Nov. 6, 2011, pp. 723-727.

* cited by examiner

METHOD OF DETECTING AND QUANTIFYING BLUR IN A DIGITAL IMAGE

TECHNICAL FIELD

The invention relates to a method of detecting and quantifying blur in a digital image, and a computer program for carrying out the method.

In numerous domains where image analysis plays a role, for example medical imaging, satellite imagery, autonomous driving, surveillance, defense, social networks, big data management, neural networks, image storage services, etc. it is important to be able to determine which images are blurry and to what extent. The general problem is determining which images are usable, for example for diagnostic purposes.

In the past, evaluation used to be performed on actual images, by the expert's eye. Nowadays, images are, or can be, digitized, that is to say discretized into pixels or elementary points of the image. Each pixel is associated with one or more numerical parameters making it possible to give a colorimetric value to the pixel, according to a predetermined coding system. A known example of such coding systems is HSB (hue, saturation, brightness), or its variant HSV (hue, saturation, value).

Various techniques already exist for quantifying the blur of a digital image. Issues then arise concerning computation time, which must be all the shorter as many images have to be processed, and concerning the relevance of the result. Methods exist for testing the sharpness of a simple image. Some methods are fast computationally (about 100 ms per 512×512 pixel image), but not very reliable (camera autofocus, color intensity analysis). These methods allow comparing a certain number of images fairly efficiently and then choosing the sharpest one, although without being able to measure the sharpness in absolute terms.

Other methods (Fourier transform, wavelet transform) are more complex and slower computationally (about 500 ms to 3 s per 512×512 pixel image) and have other drawbacks (impossible to differentiate a uniform image from a blurry image).

Many articles exist concerning blur detection in digital images. One notable example is "*Blur Detection for Digital Images Using Wavelet Transform* by HANGHANG TONG; MINGJING LI; HONGJIANG ZHANG; CHANGSHUI ZHANG; 2004 IEEE International Conference on multimedia and expo: ICME 27-30 Jun. 2004, Taipei, Taiwan". This article presents an algorithm for blur detection using the wavelet transform. The analysis is also a function of the square of the number of pixels. Thus, the computation time for an image is about one second. In addition, the blurred images used for the tests were produced using sharp source images to which various types of digital blurring were applied (blur matrices). However, digital blur is much easier to detect reliably than "analog" blur due for example to improper focus or unanticipated movement during the image capture. Another method is disclosed in US 2003/0151674.

In order to eliminate these drawbacks, a method for quantifying the blur has been proposed by patent application WO2012/080643 in which a second score is computed from a quotient. Such a method has made it possible to improve blur quantification. However, the blur objectively quantified by the second score is still too distant from the blur subjectively quantified by a user. In addition, for images comprising several billion pixels, the blur quantification is still too slow. Furthermore, such a method depends on an arbitrarily defined brightness threshold, which affects the objectivity of the results.

Quantification of blur remains an important problem and various solutions have been proposed, for example, "SlideNet: Fast and Accurate Slide Quality Assessment Based on Deep Neural Networks", Teng Zhang, Johanna Carvajal, Daniel F. Smith, Kun Zhao, Arnold Wiliem, Peter Hobson, Anthony Jennings, Brian C. Lovell.

The aim of the present invention is to overcome some or all of the above drawbacks, in particular to provide a method for quantifying blur that is even faster, more relevant and at least as reliable, if not more reliable, than existing methods, in particular for "analog" type blur.

SUMMARY

To this end, the invention relates to a method for detecting and quantifying blur in a digital image making use of a computer and comprising:
- a step a) of obtaining a digital image comprising pixels and colorimetric coding parameters associated with the pixels;
- a step b) of obtaining a brightness parameter for each pixel from the digital image, step b) comprising a convolution operation with an edge detection matrix;
- a step c) of calculating a score S1 comprising the maximum, calculated over all the pixels, of the brightness parameter obtained in step b); and
- a step d) of evaluating the digital image, the digital image being considered to be blurry if the score S1 obtained in step c) is strictly less than a first predetermined threshold $S1_0$, the score S1 providing a first quantity of blur present in the digital image.

The method is remarkable in that, in step c), is calculated a second score S2 comprising a logistic function f(x) defined as follows $$f(x) = A + \frac{K-A}{(C + Qe^{-B(x-M)})^{1/V}}$$

in which
- the parameter V is a maximum growth constant,
- the parameter A is a minimal asymptote constant,
- the parameter C is an offset constant,
- the parameter Q is a post-amplification constant,
- the parameter K is a maximal asymptote constant,
- the parameter B is a pre-amplification constant,
- the parameter M is an initialization constant,
- x corresponds to the sum, calculated on all the pixels, of the brightness parameters obtained in step b), each of them divided by a calibration constant and by the number of pixels analyzed,
- in step d), the digital image is also considered to be blurry if the score S2 obtained in step c) is strictly less than a second predetermined threshold $S2_0$, the score S2 providing, additionally, a second quantity of blur present in the digital image.

Thanks to the invention, a relevant score S2 is obtained which makes it possible to optimally reflect the quantity of blur felt subjectively. We thus have two different scores S1, S2 to measure the blur. In addition, the absence of brightness threshold processing makes it possible to increase the speed of calculating the score S2, which makes it possible to process a large quantity of pixels in a rapid and reliable manner. This is particularly advantageous when the image to be processed comprises several billion pixels, for example, in the medical field, in the defense field or in other fields. The score S2 makes it advantageously possible to avoid using a brightness threshold, which makes it possible to make the method less arbitrary, more generic and faster.

Preferably, the logistic function f(x) is a sigmoid function fs(x) defined as follows:

$$fs(x) = \frac{K}{(1 + e^{-B(x-M)})}$$

Such a sigmoid function is a special logistic function, which can be calculated at high speed. The blur can thus be quantified in an optimal manner.

Preferably, the parameters of the sigmoid function fs(x) are defined as follows:
K is between 0.1 and 4.5, preferably between 0.8 and 1.2
B is between 0.1 and 1000, preferably between 8 and 12
M is between 0 and 0.999, preferably between 0 and 0.06.

Preferably again, the parameters of the sigmoid function fs(x) are defined as follows:
K is between 0.9 and 1.1
B is between 9 and 11
M is between 0.027 and 0.033.

Such parameters are very relevant to quantify objectively a blur.

According to a preferred aspect of the invention, the calibration constant is defined so that the parameter x is between 0 and 1. Preferably, the calibration constant is the maximum brightness. The purpose of the calibration constant is to normalize the parameter x so that the normalized parameter x belongs to a determined interval, here, between 0 and 1. If the brightness parameter varies between 0 and 255, it is preferable to choose a calibration constant of 255. If the brightness parameter varies between 0 and 1, it is preferable to choose a calibration constant of 1.

Preferably, the digital image is considered to be totally sharp if the scores S1 and S2 are greater than or equal to their respective predetermined thresholds $S1_0$ and $S2_0$, as partially sharp if the score S1 is greater than or equal to the first predetermined threshold $S1_0$ and the S2 score is strictly less than the second predetermined threshold $S2_0$, or as totally blurry if the scores S1 and S2 are strictly less than their respective predetermined thresholds $S1_0$ and $S2_0$.

Preferably, with the second score S2 being expressed as a percentage, the second predetermined threshold $S2_0$ is between 0% and 100%, preferably between 50% and 100%, more preferably between 70% and 90%.

Preferably, the brightness parameter is the brightness within the meaning of the "hue, saturation, brightness" (HSB) coding.

Preferably, the brightness parameter and the S1 score are expressed as a percentage. The first predetermined threshold $S1_0$ is between 90% and 100%, preferably between 95% and 99.5%.

Preferably, images are ordered according to their level of blur by jointly using the exact values of the scores S1 and S2.

Preferably, the presence of at least one sharp area and at least one blurry area in an image is determined by jointly using the exact values of the scores S1 and S2.

The invention also relates to a computer program product, comprising at least one sequence of instructions stored and readable by a processor and which, once read by this processor, causes steps b), c) and d) of the method to be carried out as presented above. The sequence of instructions is configured to be applied to a digital image comprising pixels and colorimetric coding parameters associated with the pixels.

Preferably, the invention also relates to a computer program product, comprising at least one sequence of instructions stored and readable by a processor and which, once read by this processor, causes steps a), b), c) and d) of the method to be carried out as presented above.

The invention further relates to a computer readable medium comprising the product as presented above.

BRIEF DESCRIPTION OF THE DRAWINGS

The invention will be better understood by reading the description hereinafter, provided solely by way of example, and by referring to the appended drawings in which.

Figure 1:
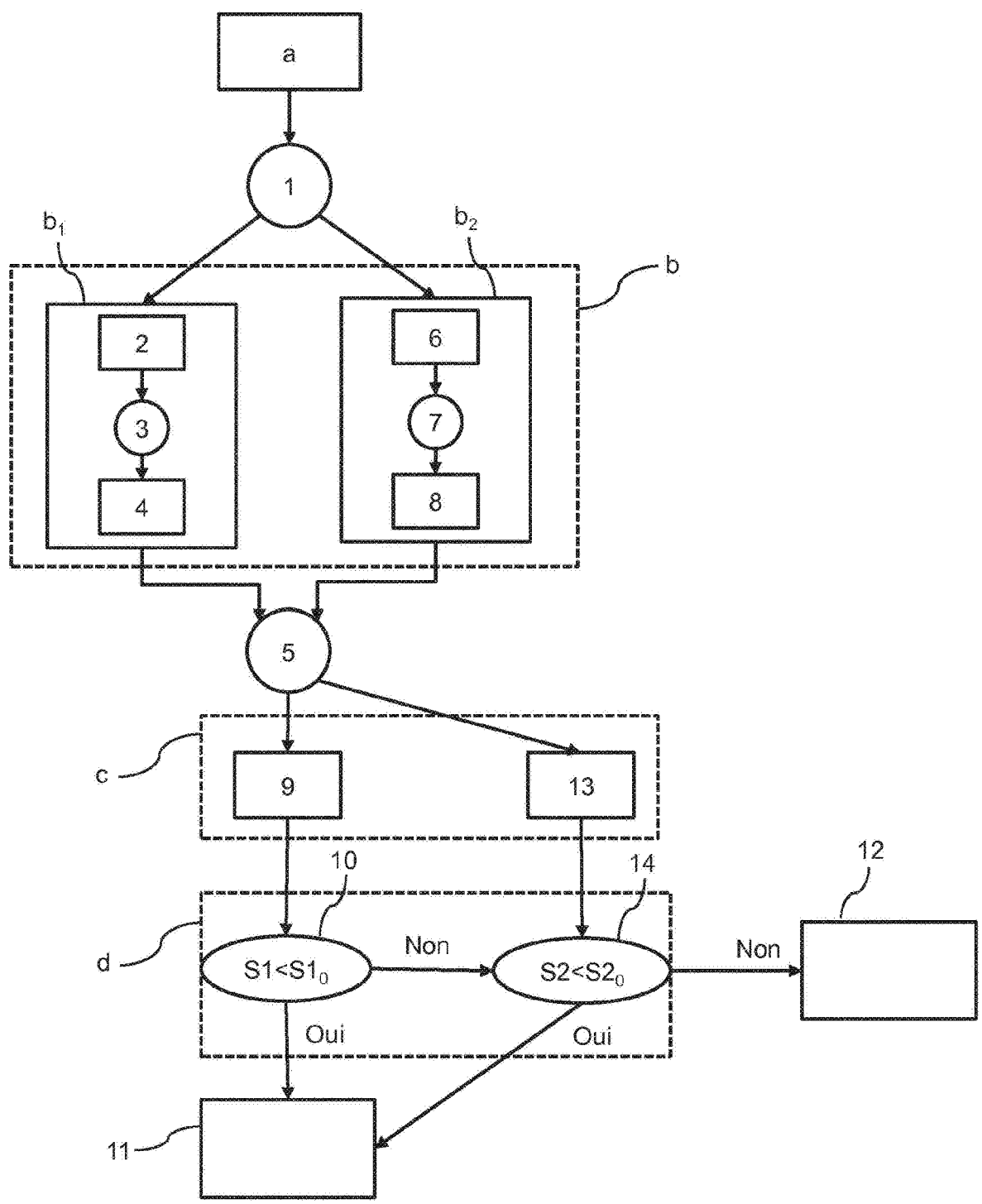
FIG. 1 illustrates an implementation of a method for detecting and quantifying blur in a digital image and FIGS. 2 to 4 are photos with medium, large and low amount of blur, respectively.

It should be noted that the figures present the invention in detail in order to implement the invention, said figures can of course be used to better define the invention if need be.

DETAILED DESCRIPTION

The invention relates to a method for detecting and quantifying blur in a digital image making use of a computer and comprising:
  a step a) of obtaining a digital image comprising pixels and colorimetric coding parameters associated with the pixels;
  a step b) of obtaining a brightness parameter for each pixel from the digital image, step b) comprising a convolution operation with an edge detection matrix;
  a step c) of calculating a score S1 comprising the maximum, calculated over all the pixels, of the brightness parameter obtained in step b); and
  a step d) of evaluating the digital image, the digital image being considered to be blurry if the score S1 obtained in step c) is strictly less than a first predetermined threshold, the score S1 providing a first quantity of blur present in the digital image.

"Obtaining a digital image" is understood to mean that a digital image is procured. This can be pre-existing or it can be generated by any suitable means known to those skilled in the art, such as a CCD camera. Each pixel is an elemental component of the digital image. In general, the image is two-dimensional (2D), meaning that the position of the pixels can be defined with two coordinates x and y. Each pixel is associated with colorimetric coding parameters. The best known parameters are RGB ("red, green, blue") coding. Let us also quote HSV ("hue, saturation, value") and its analog HSB ("hue, saturation, brightness"). These coding systems are generally analogous and known conversion relations can be used to change from one to another. Brightness is analogous to luminosity.

The image can be of any shape. It is generally rectangular or square. The said image can be represented by a matrix associating each pixel with its colorimetric parameters. Even if the image is not rectangular, the "missing" pixels can always be added and neutral parameters assigned to them. For example, for a round image this means adding corners to it. In this example, the image is represented in matrix form, but it goes without saying that other representations are possible. In the method of the invention, it would be completely equivalent to perform the same calculations without representing them in matrix form. The matrix representation is helpful because it is ideal for computer programming and allows expressing calculations in a condensed manner. However, it is not the form of the calculation that is important, but rather its function and its result.

After the step a) of acquiring (or obtaining) a digital image, in step b) a brightness parameter is calculated for each pixel.

Step b) includes contour detection for the digital image (to find the edges) and an extraction of a brightness parameter per pixel. The contour detection is obtained by a convolution operation using an edge detection matrix.

An image can be represented by a matrix M for which each value M(x,y) is equivalent to the value of the image pixel at position (x,y). This matrix is also equivalent to a two-dimensional function f(x,y), which for each value of x and y is equal to the value of the pixel at position (x,y). Let lum(f(x,y)) be the function which extracts the luminosity value of the pixel f(x,y). One can detect that a pixel (x,y) of an image is an edge when the value of the norm of the gradient of lum(f(x,y) exceeds a certain threshold ($S_{lum}$) at (x,y). (|grad lum(f(x,y))|>$S_{lum}$). By keeping the values greater than a threshold $S_{lum}$ of the gradient of the intensity of the pixels in the image, the pixels that are included in the edges of an image are detected. (for example, with $S_{lum}$=20/255).

Another more effective manner is to detect that a pixel (x,y) of an image is an edge when the value of the norm of the gradient of the matrix M has a local maximum at (x,y), meaning when |grad lum(f(x,y))|>0 and when the value of the Laplacian of lum(f(x,y)) is zero in (x,y). ($grad^2$ lum(f(x, y))=0). By retaining the local maxima of the intensity gradient of the pixels in the image, the pixels that are included in the edges of an image are detected.

Here are a few examples of edge detection matrices (also referred to as kernels):

8-Connected Laplace Kernel:

$$EDM = \begin{matrix} -1 & -1 & -1 \\ -1 & 8 & -1 \\ -1 & -1 & -1 \end{matrix}$$

4-Connected Laplace Kernel:

$$EDM = \begin{matrix} 0 & 1 & 0 \\ 1 & -4 & 1 \\ 0 & 1 & 0 \end{matrix}$$

Sobel Kernel:

$$EDM = \begin{matrix} 1 & 0 & -1 \\ 2 & 0 & -2 \\ 1 & 0 & -1 \end{matrix}$$

Prewitt Kernel:

$$EDM = \begin{matrix} 1 & 0 & -1 \\ 1 & 0 & -1 \\ 1 & 0 & -1 \end{matrix}$$

The brightness value is extracted from the pixel colorimetric coding, which contains this information. The product of the convolution of a matrix (the digital image) by a second matrix (convolution kernel, here an edge detection matrix) is a matrix (here representing the edge detection image, meaning an image with contours defined) in which the value of each pixel is a linear combination of the value of the pixel concerned and that of its neighbors. The second matrix (edge detection matrix) contains the coefficients of the linear combination. The linear combination is intended to find the edges, in the sense specified above, contained in the initial digital image. An example of the calculation is provided below.

Let M be a first matrix of size (Ma,Mb) (with Ma rows and Mb columns), representing one of the components of the image (the luminosity for example), and let EDM be a second matrix, the edge detection matrix, of size (EDMa, EDMb), (with EDMa rows and EDMb columns). By convention, the coordinates of EDM are relative to its center, if its size is an odd number, or relative to the column and row which are closest to the center and the least distanced from the first coordinate of the matrix, if its size is an even number.

Example: for $$EDM = \begin{matrix} 0 & -1 & 0 \\ -1 & 4 & -1 \\ 0 & -1 & 0 \end{matrix}$$

of size 3×3, the numbering is as follows:
EDM1(−1,−1)=0, EDM1(−1,0)=−1, EDM1(−1,1)=0,
EDM1(0,−1)=−1, EDM1(0,0)=4, EDM1(0,1)=−1,
EDM1(1,−1)=0, EDM1(1,0)=−1, EDM1(1,1)=0.

Let M' be the matrix of size (Ma,Mb) resulting from the convolution of the matrices M and EDM. To calculate M', we proceed as follows:

$$M'(x, y) = \sum_{(m>-EDMa/2)}^{(EDMa/2)} \sum_{(n>EDMb/2)}^{(EDMb/2)} EDM(m, n) * M(x+m, y+n)$$

With m being an integer contained within the interval]−EDMa/2;EDMa/2], n being an integer contained within the interval]−EDMb/2;EDMb/2], x being an integer contained within the interval [0;Ma−1], and y being an integer contained within the interval [0;Mb−1].

In addition, M'(x,y)=0 where x<EDMa/2−1 or y<EDMb/2−1, or y≥Ma−1−(EDMa/2−1) or y≤Mb−1−(EDMb/2−1). Lastly, M'(x,y) is not defined for x<0 or y<0 or x>Ma−1 or y>Mb−1.

Thus the convolution of the entire image with the edge detection matrix will result in a new image, in which each of the components (red, green, blue, or hue, saturation, luminosity for example) will have been convoluted with the edge detection matrix. Such a step b) is known to those skilled in the art from patent application WO2012/080643.

In step c), a score (or result) S1 is calculated which contains the maximum, calculated over all the pixels, of the brightness parameter obtained in step b). S1 can be equal to this maximum (simplest case), but it is clear that a multiple of this maximum, or more generally the transformation of this maximum by a monotonic function, would also be suitable.

Step d) is the detection step. The image is considered to be blurry if the score S1 is strictly less than a first predetermined threshold $S1_0$. The determination of this first threshold $S1_0$ generally results from experience. Its value may depend on the type of digital image considered and on the severity that it is desired to give to the blur detection criterion.

In addition, the parameter S1 provides a first quantity of blur in the image. More specifically, it is 1 minus S1 (1−S1) which quantifies the blur, because the lower the value of S1 is, the greater the blur.

Tests have shown that the method provides results which agree with what the human eye considers to be more or less blurry, in particular in the case of "analog" blur due to improper focus of a focusing device, such as an optical microscope for example.

In addition, the method is fast and enables a large number of images to be processed. Most computational algorithms used in the prior art (Fourier transform, wavelets, etc.) require N-squared calculation times, N being the number of pixels, while the method of the invention is linear (calculation times proportional to N). In addition, the method is absolute, because it does not require comparing the image with a benchmark image.

The method, when applied to the issue of focusing a device that produces images, allows quickly correcting an incorrect focus (correction of "analog" blur). Steps b) and c) implement a computer.

In some particular embodiments, the invention may make use of one or more of the following characteristics:
  step b) is a step b1) of convolving the digital image with the edge detection matrix in order to obtain an edge detection image, and extracting said brightness parameter for each pixel from the edge detection image. In step b1), the convolution occurs before the brightness is extracted.
  step b) is a step b2) of extracting a brightness value for each pixel from the digital image in order to obtain a brightness matrix, and of convolving the brightness matrix with the edge detection matrix in order to obtain said brightness parameter for each pixel. Step b2) is an alternative to step b1), in which the convolution occurs after the brightness is extracted. It generally leads to the same result, with the advantage of reducing the calculations because the convolution involves the brightness only, not all parameters of the digital image.
  The brightness parameter is the brightness within the meaning of the "hue, saturation, brightness" (HSB) coding. Among all possible definitions of brightness or luminosity, brightness in the sense of the HSB color system provides good results. In addition, if the digital image is directly coded in HSB mode, the calculations for extracting the B parameter are trivial.
  with the brightness parameter and the score S1 being expressed as percentages, the first predetermined threshold is between 90% and 100%, preferably between 95% and 99.5%. These ranges are preferred ranges for "analog" type blur, in the sense that the score S1 then leads, for a large number of test images, to results which agree with what the human eye considers to be blurry or sharp.
  the first predetermined threshold is between 97% and 99%. These ranges are even more preferred in the case of "analog" blur.

In step b1), the digital image is first convolved with an edge detection matrix (EDM). In matrix terms, the product of convolving the matrix representing the digital image with a so-called "edge detection" matrix is calculated. The result of the convolution is a new matrix, representing an edge detection image. The function of this calculation is to define the contours of the digital image, that is to say to emphasize the edges. The result is a new image, where the edges are emphasized.

Then, from the edge detection image (or its representative matrix), a brightness parameter is extracted for each pixel of this image. In practice, one takes the colorimetric parameters and one calculates a brightness parameter. If the coding is HSB, this means retaining only the "B" (brightness). If another coding system was used, the calculations are more complex but do not pose any particular problems.

Step b2) is a possible alternative to step b1). It is distinguished by the fact that it begins by extracting a brightness value for each pixel. One thus obtains a brightness image, represented by a brightness matrix. Then this brightness matrix is convolved with an edge detection matrix. In this manner a brightness parameter is obtained for each pixel. This alternative is equivalent functionally and from the point of view of the results, and generally requires fewer calculations because the convolution only concerns a matrix with one colorimetric parameter (brightness value) instead of concerning a thicker matrix containing several parameters for each pixel.

According to the invention, in step c), a score S2 is calculated comprising a logistic function f(x) defined as follows $$f(x) = A + \frac{K-A}{(C+Qe^{-B(x-M)})^{1/V}}$$

in which
  the parameter V is a maximum growth constant,
  the parameter A is a minimal asymptote constant,
  the parameter C is an offset constant,
  the parameter Q is a post-amplification constant,
  the parameter K is a maximal asymptote constant,
  the parameter B is a pre-amplification constant,
  the parameter M is an initialization constant.
  x corresponds to the sum, calculated on all the pixels, of the brightness parameters obtained in step b), each of them divided by a calibration constant.

The score S2 makes it possible to quantify the blur in the image. As will be presented subsequently in step d), the digital image 1 is also considered to be blurry if the score S2 obtained in step c) is strictly less 14 than a first predetermined threshold $S2_0$.

Preferably, x corresponds to the sum, calculated on all the pixels, of the brightness parameters obtained in step b), each of them divided by a calibration constant, preferably the maximum brightness, so as to be between 0 and 1 and by the number of pixels analyzed. For example, the maximum brightness is equal to 1, in the interval [0;1] or to 255 in the interval [0;255] depending on the scale chosen. The S2 score is calibrated to be between 0 and 1, in order to facilitate its interpretability and its comparison with other scores. For an image of 10×10 pixels, the number of pixels analyzed is equal to 100.

Advantageously, the score S2 has a non-linearity making it possible to establish a relevant discrimination by means of a blur threshold. In summary, the second score S2 is calculated from the average value of the intensity of the luminosity of the edges of the image which has been calibrated. The logistics function allows relevant recentering for a limited computational cost.

The parameters V, A, C, Q, K, B, M can be derived from theoretical calculations and fine-tuned by experience. Preferably:
  the parameter V is between 0.5 and 100, preferably between 0.8 and 1.2, more preferably between 0.9 and 1.1.
  the parameter A is between −5 and 5, preferably between −0.2 and 0.2, more preferably between −0.1 and 0.1.
  the parameter C is between 0 and 100, preferably between 0.9 and 1.1, more preferably between 0.98 and 1.02.
  the parameter Q is between 0.1 and 10, preferably between 0.8 and 1.2, more preferably between 0.9 and 1.1.
  the parameter K is between −2 and 4.5, preferably between 0.8 and 1.2, more preferably between 0.9 and 1.1.
  the parameter B is between 0.1 and 1000, preferably between 8 and 12, more preferably between 9 and 11.
  the parameter M is between 0 and 0.999, preferably between 0 and 0.06, more preferably between 0.027 and 0.033.

These ranges are preferred ranges for the "analog" type blur, in the sense that the scores S1 and S2 then lead, over a large number of test images, to results which agree with what the human eye considers to be blurry or sharp.

Among the logistic functions f(x), the sigmoid function fs(x) is advantageous in terms of speed and relevance.

A sigmoid function fs(x) is a logistic function f(x) whose parameters are defined as follows:
  the parameter V is equal to 1
  the parameter A is equal to 0
  the parameter C is equal to 1
  the parameter Q is equal to 1
The sigmoid function $f_s(x)$ is defined as follows:

$$fs(x) = \frac{K}{(1 + e^{-B(x-M)})}$$

in which
the parameter K is a maximal asymptote constant,
the parameter B is a pre-amplification constant, and
the parameter M is an initialization constant.
Preferably:
  the parameter K is between 0.8 and 1.2, preferably between 0.9 and 1.1.
  the parameter B is between 8 and 12, preferably between 9 and 11.
  the parameter M is between 0 and 0.06, preferably between 0.027 and 0.033.

Advantageously, the score S2 measures the average quality of an image. It is used in combination with other measurements, which among other things judge the quality of the best areas of the image.

And in step d), the digital image is also considered to be blurry if the score S2 obtained in step c) is strictly less than a second predetermined threshold $S2_0$, the score S2 providing, additionally, a second quantity of blur present in the digital image. This parameter, or score, S2 completes the first score S1. To be considered sharp, the image must also have a score S2 greater than or equal to a second predetermined threshold $S2_0$. The same interpretation remarks, made for the calculation of the S1 score and the first predetermined threshold, apply to the calculation of the score S2 and to the second threshold. In particular, the score S2 can be the formula above, or else a monotonic function of this formula.

The second predetermined threshold $S2_0$ can be derived from theoretical calculations and fine-tuned through experience. The score S2 generally gives a finer quantification of the blur present in the digital image than the first score S1 does. It is for example possible to use the score S1 in an "all or nothing" fashion, that is to say decide that the image is blurry or sharp on the basis of the first score S1. One can use the score S2 as a quantification of blur.

Preferably, with the brightness parameter and the score S2 being expressed as percentages, and the second predetermined threshold $S2_0$ is between 0% and 100%, preferably between 50% and 100%, more preferably between 70% and 90%.

FIG. 1 illustrates a method for detecting and quantifying blur in a digital image according to the invention.

Step a) consists in obtaining a digital image 1, for example using a digital video camera or camera. The image can for example have 512×512 pixels and be coded in HSB (hue, saturation, brightness). The coding parameters can be expressed in absolute terms, or as percentages. 100% means that the parameter is at its maximum on a predetermined scale (for example from 0 to 255).

Then an image processing step b) is carried out. In the example, it is of type b2). One starts by extracting (sub-step 6) a brightness value for each pixel from the digital image 1. In this manner, for each pixel, one has the parameters H, S, B of the colorimetric coding and one only keeps the parameter B. A brightness matrix 7 is obtained. This brightness matrix 7 is convolved (sub-step 8) with an EDM edge detection matrix, for example the so-called Laplace matrix, a 3×3 matrix with the following form:

$$EDM = \begin{matrix} -1 & -1 & -1 \\ -1 & 8 & -1 \\ -1 & -1 & -1 \end{matrix}$$

This amounts, at each location of the image brightness represented by the matrix 7, to calculating a kind of Laplacian of the brightness values. The edges contained in the result image have a zero brightness value.

Alternatively, a Sobel matrix can be used as an edge detection matrix. In this case:

$$EDM = \begin{matrix} -2 & -2 & 0 \\ -2 & 0 & +2 \\ 0 & +2 & +2 \end{matrix}$$

One can also use linear combinations (or rotations by multiples of pi/4) of Laplace and Sobel matrices, or their transposes.

The result of the convolution is a new matrix 5 (or image) which contains one brightness parameter per pixel. The contour of this image is outlined by the convolution effect.

Next, in step c), the score S1 is calculated (sub-step 9). This is the maximum brightness parameter over all the pixels that is obtained at the end of steps b1) or b2) (step b2) in this example).

In step d), the result or results obtained in step c) are used. The method uses the score S1 defined above (criterion 10). If it is greater than or equal to this first predetermined threshold $S1_0$, the digital image 1 is considered to be sharp (case 12). If it is strictly less than a first predetermined threshold $S1_0$ (for example 98%), the score S2 must be calculated to quantify the blur and determine whether it is acceptable. The score S1 also makes it possible to quantify the blur. More precisely, the larger 1–S1 is, the greater the blur.

In the method, step b1) represents a possible alternative to step b2). In step b1), one always starts from the digital image 1 representable by a matrix. The step begins with convolving (sub-step 2) this matrix 1 with the edge detection matrix EDM. Thus the convolution concerns all parameters of the digital image and not only the brightness. An edge detection image 3 is obtained. Next, in sub-step 4, a brightness parameter is extracted for each pixel, from the edge detection image 3; this forms the matrix 5. Step b2) is an alternative to step b1), which generally requires fewer calculations. When examining a series of images, generally either one or the other of steps b1) or b2) is consistently applied in order to maintain uniformity in the processing. In other words, either b1) or b2) is chosen once and for all when examining a series of images.

In the method, in step c), the sigmoid function f(x) is calculated (sub-step 13)

$$fs(x) = \frac{K}{(1 + e^{-B(x-M)})}$$

The sigmoid function f(x) is calculated for a value x corresponding to the sum, calculated over all the pixels, of the brightness parameters obtained in step b), each one of them divided by the maximum brightness (1, in the interval [0;1] or 255 in the interval [0;255] for example, according to the chosen scale) as well as by the number of pixels analyzed. The second score S2 is thus between 0 and 1 and is expressed as a percentage.

It goes without saying that other sigmoid functions or other logistic functions may be suitable. The sigmoid function, which exhibits the best results with the greatest speed, was presented.

In step d), the score S2 is compared (test 14) with a second predetermined threshold $S2_0$ (for example 75%). For an image to be considered sharp, S1 must be greater than or equal to $S1_0$ and S2 must be greater than or equal to $S2_0$ (case 12). Conversely, if S1 is strictly less than $S1_0$ or if S2 is strictly less than $S2_0$ (case 11), the image is considered to be blurry. S1 and S2 quantify the blur (or else 1–S1 and 1–S2). One could also calculate a score comprising these two scores, for example a norm of the vector (S1,S2).

The joint calculation of the first score S1 and of the second score S2 makes it possible in this manner to detect whether an image is:

totally sharp: in this case, S1 and S2 are greater than or equal to their respective predetermined thresholds $S1_0$ and $S2_0$;

partially sharp, that is, there is at least one sharp area in the image and the rest of the image is blurry: in this case, S1 is greater than or equal to $S1_0$ and S2 is strictly less than $S2_0$;

totally blurry: in this case, S1 and S2 are strictly less than their respective predetermined thresholds $S1_0$ and $S2_0$.

When used together, the exact values of S1 and S2 also make it possible to order images according to their level of sharpness (or their level of blur).

In particular, the values of S1 and S2 are necessary to determine that an image is partially sharp, that is to say that it contains both at least one sharp area and at least one blurry area.

Figure 2:
Figure 3:
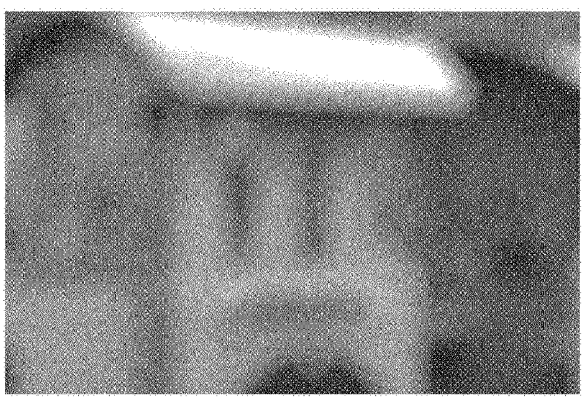

A method according to the invention was applied to FIGS. 1 to 3 with the following parameters:

the parameter K is equal to 1, the parameter B is equal to 10, the parameter M is equal to 0.03, the second predetermined threshold $S2_0$ of 75%;

S1 was calculated using a step b) of type b2) with a first predetermined threshold $S1_0$ of 98%.

Figure 4:

The following results were obtained:

partially sharp image 1 (FIG. 2): score S1 of 100%, score S2 of 65.93%, blurry image 2 (FIG. 3): score S1 of 49%, score S2 of 51.62%, sharp image 3 (FIG. 4): score S1 of 100%, score S2 of 76.53%, It follows that the image 3 (FIG. 4) is detected as sharp from the point of view of the score S2 (S2 is greater than or equal to the second predetermined threshold $S2_0$ which is 75%) and from the point of view of the score S1 (S1 is greater than or equal to the first predetermined threshold $S1_0$ which is 98%). The amount of blur in image 3 is given by the scores S1 and S2. On the contrary, for image 2 (FIG. 3), the score S2 is strictly less than the second predetermined threshold and S1 is strictly less than the first predetermined threshold. Image 2 (FIG. 3) is therefore detected as blurry. The amount of blur in image 2 is given by the scores S1 and S2. One may also, if one prefers, express the amount of blur by 1–S1 and 1–S2, in order to have quantities which increase together with the blur. Likewise, image 1 (FIG. 2) is detected as sharp from the point of view of the score S1 (S1 is greater than or equal to the first predetermined threshold $S1_0$) but the score 2 reveals a significant amount of blur (S2 is less than or equal to the second predetermined threshold $S2_0$). In other words, image 1 is considered to be blurry from the point of view of the S2 score but sharp from the point of view of the score S1. It can also be deduced from this that, for the images 1 and 2, the focusing is not suitable and that the images are blurry.

The invention claimed is:

1. A method of detecting and quantifying blur in a digital image, making use of a computer and comprising:

a step a) of obtaining a digital image comprising pixels and colorimetric coding parameters associated with the pixels;

a step b) of obtaining a brightness parameter for each pixel from the digital image, said step b) comprising a convolution operation with an edge detection matrix;

a step c) of calculating a score S1 comprising a maximum, calculated over all the pixels, of the brightness parameter obtained in said step b); and a step d) of evaluating the digital image, said digital image being considered to be blurry if the score S1 obtained in said step c) is strictly less than a first predetermined threshold $S1_0$, the score S1 providing a first quantity of blur present in the digital image;

wherein in said step c), a score S2 is calculated including a logistic function f(x) defined with parameters as follows:

$$f(x) = A + \frac{K-A}{(C + Qe^{-B(x-M)})^{1/V}}$$

in which,
the parameter V is a maximum growth constant,
the parameter A is a minimal asymptote constant,
the parameter C is an offset constant,
the parameter Q is a post-amplification constant,
the parameter K is a maximal asymptote constant,
the parameter B is a pre-amplification constant,
the parameter M is an initialization constant,
x corresponds to a sum, calculated on all the pixels, of the brightness parameters obtained in said step b), each of them divided by a calibration constant and by a number of pixels analyzed, and
wherein in said step d), the digital image is also considered to be blurry if the score S2 obtained in said step c) is strictly less than a second predetermined threshold $S2_0$, the score S2 additionally providing a second quantity of blur present in the digital image.

2. The method according to claim 1, wherein the logistic function f(x) is a sigmoid function fs(x) defined with parameters as follows:

$$fs(x) = \frac{K}{(1 + e^{-B(x-M)})}.$$

3. The method according to claim 2, wherein the parameters of sigmoid function fs(x) are defined as follows:
K is between 0.1 and 4.5, preferably between 0.8 and 1.2
B is between 0.1 and 1000, preferably between 8 and 12
M is between 0 and 0.999, preferably between 0 and 0.06.

4. The method according to claim 2, wherein the parameters of sigmoid function fs(x) are defined as follows:
K is between 0.9 and 1.1
B is between 9 and 11
M is between 0.027 and 0.033.

5. The method according to claim 1, wherein the calibration constant is defined so that the parameter x is between 0 and 1.

6. The method according to claim 1, wherein the calibration constant is the maximum brightness.

7. The method according to claim 1, wherein the digital image is considered to be totally sharp if the scores S1 and S2 are greater than or equal to their respective predetermined thresholds $S1_0$ and $S2_0$, as partially sharp if the score S1 is greater than or equal to the first predetermined threshold $S1_0$ and the S2 score is strictly less than the second predetermined threshold $S2_0$, or as totally blurry if the scores S1 and S2 are strictly less than their respective predetermined thresholds $S1_0$ and $S2_0$.

8. The method according to claim 1, wherein the second score S2 being expressed as a percentage, the second predetermined threshold $S2_0$ is between 0% and 100%, preferably between 50% and 100%, more preferably between 70% and 90%.

9. The method according to claim 1, wherein the brightness parameter is the brightness within the meaning of the "hue, saturation, brightness" coding.

10. The method according to claim 1, wherein the brightness parameter and the score S1 being expressed as percentages, the first predetermined threshold $S1_0$ is between 90% and 100%, preferably between 95% and 99.5%.

11. The method according to claim 1, wherein images are ordered according to their level of blur by jointly using the exact values of the scores S1 and S2.

12. A non-transitory computer-readable medium comprising at least one sequence of instructions stored and readable by a processor and which, once read by the processor, causes the following steps to be carried out:
a step a) of obtaining a digital image comprising pixels;
a step b) of obtaining a brightness parameter for each pixel from the digital image, said step b) comprising a convolution operation with an edge detection matrix;
a step c) of calculating a score S1 comprising a maximum, calculated over all the pixels, of the brightness parameter obtained in said step b); and
a step d) of evaluating the digital image, said digital image being considered to be blurry if the score S1 obtained in said step c) is strictly less than a first predetermined threshold $S1_0$, the score S1 providing a first quantity of blur present in the digital image;
wherein in said step c), a score S2 is calculated including a logistic function f(x) defined with parameters as follows:

$$f(x) = A + \frac{K-A}{(C + Qe^{-B(x-M)})^{1/V}}$$

in which,
the parameter V is a maximum growth constant,
the parameter A is a minimal asymptote constant,
the parameter C is an offset constant,
the parameter Q is a post-amplification constant,
the parameter K is a maximal asymptote constant,
the parameter B is a pre-amplification constant,
the parameter M is an initialization constant,
x corresponds to a sum, calculated on all the pixels, of the brightness parameters obtained in said step b), each of them divided by a calibration constant and by a number of pixels analyzed, and
wherein in said step d), the digital image is also considered to be blurry if the score S2 obtained in said step c) is strictly less than a second predetermined threshold $S2_0$, the score S2 additionally providing a second quantity of blur present in the digital image.

* * * * *